(12) United States Patent
Evans

(10) Patent No.: US 6,344,221 B1
(45) Date of Patent: Feb. 5, 2002

(54) COMPOSITIONS AND METHODS FOR REDUCTION OF EFFECTS OF ENDOPHYTE-INFECTED FORAGES

(75) Inventor: Jeffrey W. Evans, Versailles, KY (US)

(73) Assignee: Alltech, Inc., Nicholasville, KY (US)

( * ) Notice: Subject to any disclaimer, the term of this patent is extended or adjusted under 35 U.S.C. 154(b) by 0 days.

(21) Appl. No.: 09/564,134

(22) Filed: May 3, 2000

Related U.S. Application Data

(60) Provisional application No. 60/132,224, filed on May 3, 1999.

(51) Int. Cl.⁷ .................................................. A23K 1/175
(52) U.S. Cl. .............................. 426/2; 426/74; 426/635; 426/807
(58) Field of Search .............................. 426/2, 74, 635, 426/807

(56) References Cited

U.S. PATENT DOCUMENTS

| 4,847,243 A | 7/1989 | Wallace ........................ 514/30 |
| 4,880,632 A | 11/1989 | Lipham et al. ............. 424/425 |
| 5,372,818 A | 12/1994 | Cross et al. ................. 424/442 |
| 5,639,492 A * | 6/1997 | Turk et al. ...................... 426/2 |
| 5,718,900 A | 2/1998 | Hill et al. ................. 424/194.5 |
| 5,935,623 A * | 8/1999 | Alonso-Debolt ............... 426/2 |
| 6,045,834 A | 4/2000 | Howes et al. .................. 426/2 |

FOREIGN PATENT DOCUMENTS

EP 0311195 4/1989

OTHER PUBLICATIONS

J. Moyer, et al., "Crop Quality & Utilization: Degradation of Ergoline Alkaloids during In Vitro Ruminal Digestion of Tall Fescue Forage", Crop Science, Mar.–Apr. 1993, pp. 264–266. vol. 33.

* cited by examiner

Primary Examiner—Chhaya D. Sayala
(74) Attorney, Agent, or Firm—King and Schickli PLLC

(57) ABSTRACT

A method of binding and inactivating ergot alkaloids from forages is described whereby a combination of a modified yeast cell wall extract and a mineral clay is fed to animals in amounts sufficient to inactivate alkaloids present in the forages. The yeast cell wall extract/clay mixture may be admixed with feeds, incorporated directly into pelleted feeds, or fed directly to animals.

14 Claims, 3 Drawing Sheets

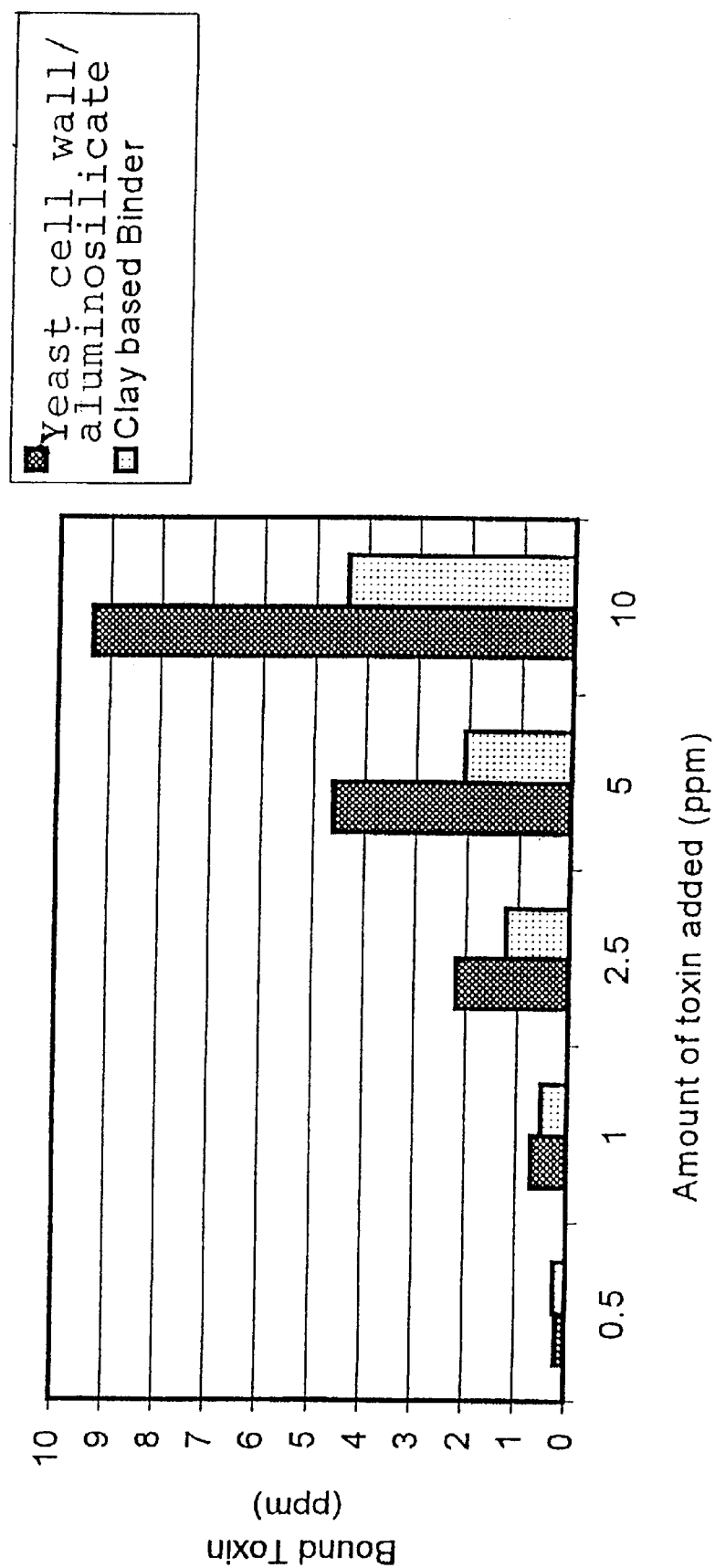
FIG. 1 In vitro binding of ergotamine

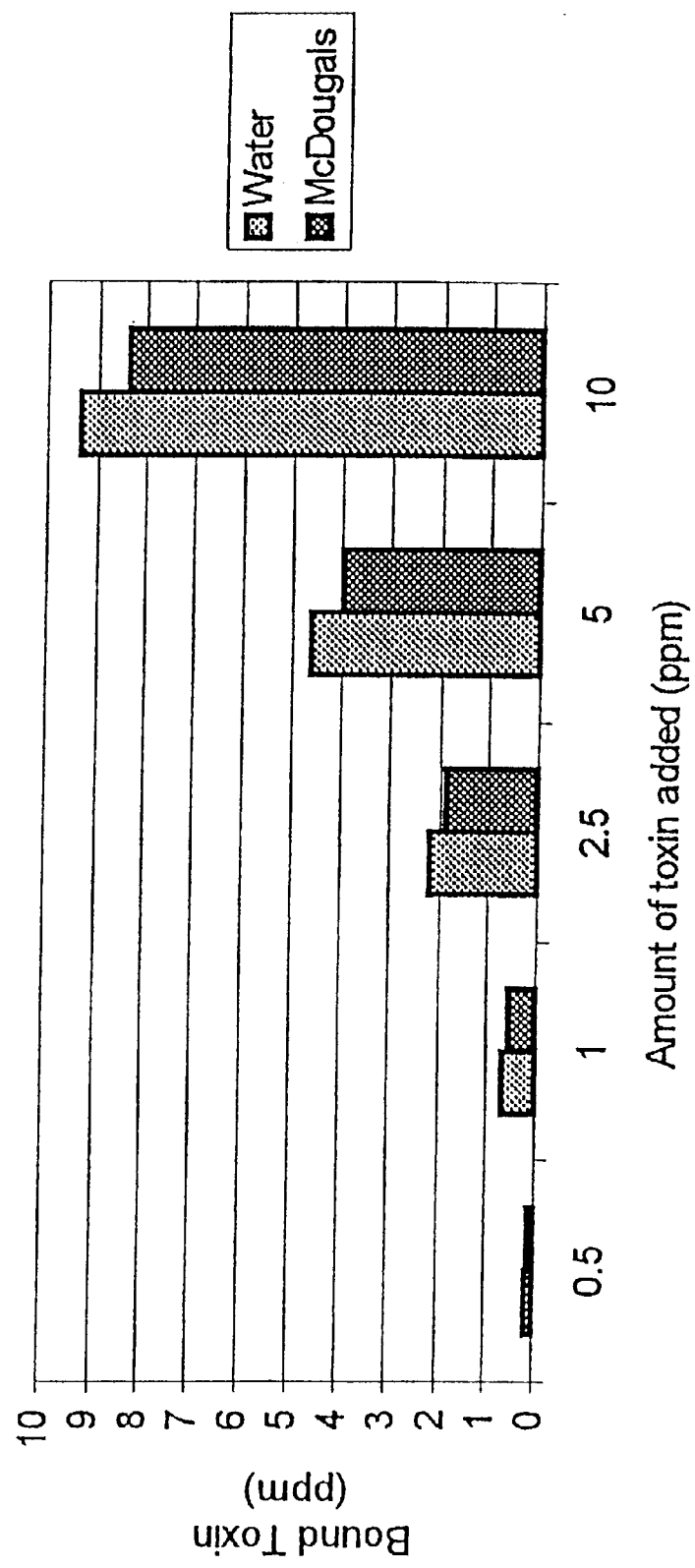
FIG. 2 Binding of ergotamine by yeast cell wall extract/aluminosilicate in artifical saliva (McDougal's solution).

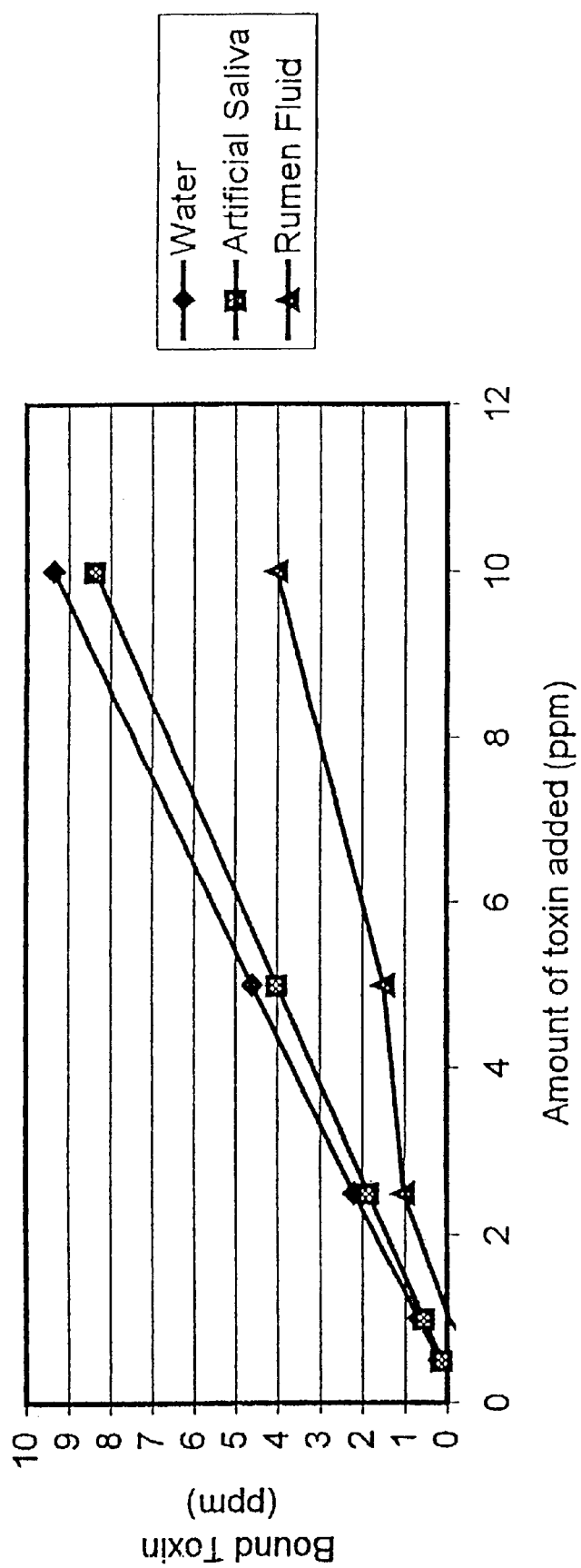
FIG. 3 Binding of ergotamine by yeast cell wall extract/aluminosilicate in rumenfluid.

the surprising discovery that feeding a composition comprising a combination of a modified yeast cell wall extract and a clay such as a zeolite, bentonite, or other aluminosilicate clay has an additive binding effect for reducing effects of fungal alkaloid diseases such as fescue toxicosis. In particular, the invention provides a method and composition for reducing unhealthful effects of ergot alkaloids, especially ergopeptine and clavine alkaloids, present in forages such as fescue hay infected with fungi such as *Neotyphodium coenophialum* (formerly *Acremonium coenophialum*).

COMPOSITIONS AND METHODS FOR REDUCTION OF EFFECTS OF ENDOPHYTE-INFECTED FORAGES

This application claims the benefit of priority in provisional application Ser. No. 60/132,224, filed on May 3, 1999.

FIELD OF THE INVENTION

The present invention provides the surprising discovery that feeding a composition comprising a combination of a modified yeast cell wall extract and a clay such as a zeolite, bentonite, or other aluminosilicate clay has an additive binding effect for reducing effects of fungal alkaloid diseases such as fescue toxicosis. In particular, the invention provides a method and composition for reducing unhealthful effects of ergot alkaloids, especially ergopeptine and clavine alkaloids, present in forages such as fescue hay infected with fungi such as *Neotyphodium coenophialum* (formerly *Acremonium coenophialum*).

The compositions of the invention are comprised of a modified yeast cell wall extract and aluminosilicate clay. In a preferred embodiment, the composition contains between about 1% and about 10% aluminum silicate clay, and about 90% to 99% modified yeast cell wall extract. Especially preferred compositions of the invention comprise from between about 2% to about 4% aluminum silicate and between about 96% and about 98% modified yeast cell wall extract.

In one embodiment, the modified yeast cell wall extract is available from Alltech, Inc., Nicholasville, Ky. and the aluminum silicate is a standard commercial grade available from a variety of sources. The yeast cell wall extract is extracted from a yeast organism, which can be any of a number of yeasts. Preferred embodiments of the invention, however, utilize cell wall extracts from Saccharomyces species, e.g. *S. cerevisiae*, or from a Torula yeast.

The compositions described may be fed to any grazing animal, including but not limited to ruminant and equine species. When admixed with feed or fed as a supplement, the compositions with their increased alkaloid binding capability decrease absorption or uptake of the alkaloids by the affected animal, improving performance and health and reducing incidence of endophyte-related diseases such as fescue toxicosis or ryegrass staggers. The composition comprises feeding a combination of a modified yeast cell wall extract and a clay such as a zeolite, bentonite, or other aluminosilicate clay. This combination has a surprising and unexpected additive binding effect for reducing effects of alkaloid contamination on animals consuming infected feedstuffs.

BACKGROUND OF THE INVENTION

Tall fescue (*F. arundinacea*) is the major forage grass in the eastern and northwestern United States, covering 10,140,000 hectares in 21 states. It is the most abundant and economically important cool season perennial grass grown in the U.S. Tall fescue is desirable because of its ease of establishment, range of adaptation, and extended grazing season. The nutritional composition compares favorably with other cool season grasses, however, performance of cattle grazing fescue during summer months is generally less than would be expected for the nutrient composition of the grass.

As tall fescue became a popular forage grass in the mid-twentieth century, reports of adverse effects on cattle grazing fescue began to accumulate. It was not until 1977 that conclusive evidence of the presence of the endophytic fungus *A. coenophialum* in tall fescue and its correlation to fescue toxicosis in cattle was reported. The presence of endophyte was reported in 58% of forage samples submitted from 26 states. A more recent study of 200 fields reported endophyte infection (EI) rates as high as 97%, and infection levels of individual fields greater than 67% for the majority of the fields. The problem is not localized in the US, as EI tall fescue has been reported in New Zealand, Italy, Wales, France and Poland.

Economic losses due to endophyte infections of tall fescue are substantial. Cattle grazing EI tall fescue have been shown to have reduced weaning weights and reduced conception rates. Losses to the equine industry can be substantial due to reduced reproductive performance in mares and losses to the dairy industry are mainly due to reduced milk production. Wildlife is also affected by EI tall fescue, because of the negative impact on hunting and hunting permit sales.

A variety of different symptoms including reduced body weight gain, increased body temperature, rough hair coat, reduced reproductive performance, fescue foot, excessive salivation, lower milk production and lower serum prolactin levels have been reported in animals consuming EI tall fescue. Research has been conducted on horses, sheep, cattle, quail, rabbits, and rats. It is pertinent to briefly discuss the effects on cattle and horses.

The earliest symptom recognized in cattle grazing EI tall fescue is fescue foot, a condition in which foot tissue death occurs in animals grazing on endophyte infested fescue pastures. Ergot alkaloids have been found to have a vasoconstrictive effect in vitro, decreasing blood flow to extremities, explaining the development of fescue foot. The vasoconstriction reduces blood flow to the skin affecting thermoregulation. Increased rectal temperatures have also been reported in animals fed EI tall fescue.

The two most significant losses caused by fescue toxicosis are reductions in feed intake and body weight gain. Reduction in weight gain have been noticed in cattle and to a lesser extent in horses. It has been suggested that reduced feed intake may be due to physical and physiological mechanisms of the toxins. The increased body temperature might be one of the main factors involved in depressing intake. Reduced feed intake in combination with a reduction in digestibility is the reason for weight gain depression.

Major reproductive problems in cattle and horses have been related to EI tall fescue. Fescue toxins affect reproduction in both males and females. The majority of research in this area has been done with females, focusing mainly on pregnant mares. Agalactia is the most commonly reported clinical sign in mares consuming infected fescue. Other effects in mares include prolonged gestation, thickened placentas, extremely high levels of foal mortality, and dystocia. The mechanisms thought to be responsible for reproductive problems are, decreased concentrations of prolactin and melatonin, vasoconstriction affecting blood flow to internal organs, and hyperthermia. Accordingly, methods and compositions capable of reducing effects of plant alkaloids causing diseases such as fescue toxicity and ryegrass staggers would be of great value.

SUMMARY OF THE INVENTION

Accordingly, it is a primary object of the present invention to provide a method for binding and subsequent inactivation of alkaloids associated with diseases such as fescue toxicity.

It is a further object of the present invention to provide a method for binding and subsequent inactivation of alkaloids associated with diseases such as fescue toxicity comprising a combination of a modified yeast cell wall extract and a mineral clay such as a zeolite or bentonite clay, or aluminum silicate.

Yet another object of the present invention is to provide a composition comprising a combination of a modified yeast cell wall extract and a mineral clay as described above which provides a surprising and unexpected additive binding effect for inactivation of alkaloids associated with diseases such as fescue toxicity, Additional objects, advantages and other novel features of the invention will be set forth in part in the description that follows and in part will become apparent to those skilled in the art upon examination of the following or may be learned with the practice of the invention. To achieve the foregoing and other objects, and in accordance with the purposes of the present invention as described herein, a novel method is described for binding and inactivation of alkaloids associated with diseases such as fescue toxicity. In particular, the invention provides a method and a composition for inactivation of alkaloids associated with diseases such as fescue toxicity encompassing a modified yeast cell wall extract and aluminosilicate. The yeast cell wall is extracted from a yeast organism which can be any of a number of yeasts. The aluminosilicate is a standard commercial grade available from a variety of sources.

The compositions provided by the invention can be fed to any animal including, but not limited to, bovine, equine, ovine, and caprine species. When admixed with feed or fed as a supplement, the compositions with their surprisingly increased alkaloid-binding capacity decrease absorption or uptake of the alkaloids by the affected animal, thereby improving performance and health, and reducing the incidence of alkaloid associated diseases such as fescue toxicity.

BRIEF DESCRIPTION OF THE DRAWING

The accompanying drawing incorporated in and forming a part of the specification illustrates several aspects of the present invention and, together with the description, serves to explain the principles of the invention. In the drawing:

FIG. 1 shows in vitro binding of ergotamine by the yeast cell wall extract/aluminosilicate composition of the present invention.

FIG. 2 shows in vitro binding of ergotamine in McDougal's solution by the yeast cell wall extract/aluminosilicate composition of the present invention.

FIG. 3 shows in vitro binding of ergotamine in rumen fluid by the yeast cell wall extract/aluminosilicate composition of the present invention.

Reference will now be made in detail to the presently preferred embodiments of the invention, examples of which are illustrated in the accompanying drawing.

DETAILED DESCRIPTION OF THE INVENTION

The present invention is based upon the surprising discovery that a yeast cell wall-derived extract in combination with a mineral clay provides an unexpected additive binding effect on endophyte-related alkaloids in animal forages. The invention provides a method and a composition for binding alkaloids present in animal forages utilizing such a yeast cell wall extract/clay combination.

The yeast organism used for the composition of the present invention may be any of a number of edible yeasts including, but not limited to, Saccharomyces, Candida, Kluyveromyces, or Torulaspora species. In a preferred embodiment the yeast used is *Saccharomyces cerevisiae* strain 1026.

The yeast cell wall extract is obtained by methods commonly known in the art (See, Peppler, H. J. 1979. Production of yeasts and yeast products. Page 157 in: Microbial Technology & Microbial Processes, Vol.1 (2d Ed.), Academic Press). Briefly, the yeast organism is grown following common techniques used in food-related fermentations and the beverage industries. Any of a number of common sugar-containing media, such as diluted molasses, may be used to provide a source of sugars for growth of the yeasts. Other media which may be employed include wood sugars, sulfite waste liquor, and whey.

The yeast biomass may then be separated and washed by centrifugation to yield a yeast cream. Following separation, the organism is lysed. Any of a number of methods common in the art may be utilized to lyse the yeast organisms, including autolysis and hydrolysis. A preferred embodiment of the current invention allows the yeast organisms to autolyse at room temperature and pressure over a 12–24 hr period. A protease such as papain or any of a number of alkaline or neutral proteases may be added during the lysis phase to accelerate solubilization of yeast proteins and prevent agglutination of intracellular components.

Following autolysis, the resultant yeast cell wall extract is washed several times by centrifugation to remove intracellular components and concentrate the extract. The resulting extract concentrate may be dried by any of a number of methods common in the art, including spray-drying or drum drying to form a hygroscopic, water-soluble powder.

The present invention also provides a method of enhancing and improving the alkaloid-binding characteristics of a yeast cell wall extract comprising modification of the extract by an alcohol shocking of the yeast organism during growth, e.g. during fermentation, resulting in a thickening of the yeast cell wall and an increase in the surface area available for alkaloid binding of the resultant cell wall extract. Any of a number of standard commercially available alcohols may be used, including, but not limited to methyl, ethyl, and isopropyl alcohols. In a preferred embodiment of the current invention, the alcohol-shock of the yeast organism is accomplished using ethyl alcohol. The alcohol shock of the yeast organisms can be performed by exposing the yeast organism to an environment comprising between about 5% and about 20% alcohol during growth. In a further embodiment the yeast organism is exposed to an environment comprising between 8% to 15% alcohol during growth. In a preferred embodiment, the yeast organism is exposed to an environment comprising between 10% and about 12% alcohol during growth.

The mineral clays used in the composition of the present invention may be any of a number of standard commercial grade clays suitable for inclusion in animal diets, including, but not limited to, zeolite and bentonite clays, or aluminosilicate. Clays may be obtained from a variety of commercial sources. In a particularly preferred embodiment, the invention comprises inclusion of aluminosilicate, available from a variety of commercial sources.

In a preferred embodiment, the composition of the present invention comprises between about 1% and about 10% aluminum silicate, and between about 90% and about 99% modified yeast cell wall extract. A preferred composition of the invention comprises from between about 4% to about 8% aluminum silicate and between about 92% and about 96% yeast cell wall extract. An especially preferred embodiment of the invention comprises from between 5% to about 7% aluminum silicate and between about 93% and about 95% yeast cell wall extract. The preferred physical form of the invention is a dry, free-flowing powder suitable for direct inclusion into animal feeds or as a supplement to a total mixed ration.

The compositions provided by the present invention may be incorporated directly into commercially available feeds or fed as a supplement to commercially available feeds. The composition contained in the present invention may be fed to any animal, including but not limited to, bovine, equine, ovine, and caprine species. The methods of the invention comprise reducing effects of endophyte-related alkaloids present in animal forages, thereby increasing safety and nutritional value of the feedstuffs and the overall health and performance of the animal. When incorporated directly into animal feeds, the present invention may be added to such feeds in amounts ranging from 0.25 to about 4 kilograms per ton of feed. In a preferred composition, the invention is added to feeds in amounts ranging from 0.5 to about 3 kilograms per ton of feed. In an especially preferred composition, the invention is added to feeds in amounts ranging from 1 to 2 kilograms per ton of feed.

The methods of the invention comprise increasing binding and removal of endophyte-related ergot alkaloids, e.g. ergopeptine and clavine alkaloids from animal forages, including, but not limited to, ergovaline, ergotamine, ergovalinine, ergonovine, agroclavine, elymoclavine, ergosine, and ergocornine and the like, thereby increasing safety and nutritional value of the forage and the overall health and performance of the animal. The compositions of the invention are especially effective in increasing binding of Ergovaline, Ergovalinine and Ergotamine compared to binding obtained with individual components of the invention alone. However, binding and inactivation of loline alkaloids such as N-foamy/loline and N-acetyl loline are also considered within the scope of the invention.

The composition contained in the present invention may be added to animal feedstuffs in amounts from about 0.0125% to 0.4% by weight of feed. In a preferred embodiment, the composition is added to animal feedstuffs in amounts from about 0.025% to 0.2% by weight of feed. In an especially preferred embodiment, the invention is added to animal feedstuffs in amounts from about 0.04% to 0.1% by weight of feed.

Alternatively, the composition contained in the present invention may be directly fed to animals as a supplement in amounts ranging from 2.5 to 20 grams per animal per day. An especially preferred embodiment comprises feeding the composition contained in the present invention to animals in amounts ranging from 10 to 15 grams per animal per day. One of skill in the art can appreciate that the amount of the composition fed can vary depending upon the animal species, size of the animal and the type of feedstuff to which the composition is to be added.

EXAMPLES

The following examples are intended to be illustrative of the invention, and are not to be considered restrictive of the scope of the invention as otherwise described herein.

Example 1

The following experiments illustrate the ability of the composition provided by the present invention to bind ergot alkaloids compared to other binders. Graph A shows in vitro binding of purified ergotamine by the composition of the present invention compared to a traditional clay binder. Binders were added at a concentration of 2 mg/ml, while ergotamine was added at varying concentrations. The binding assays were allowed to run for 1.5 hr with shaking. Following centrifiugation, toxin levels in supernatant were measured by HPLC assay.

Especially at higher concentrations of toxin, the present invention, i.e. a modified yeast cell wall extract in combination with a suitable mineral clay, bound a significantly higher percentage of toxin compared to a traditional clay-based binder.

Table 1 below demonstrates the efficacy of the present invention for in vitro binding of ergotamine compared to a yeast extract (Particulate Yeast Glucan) alone. Results are given as peak area from an HPLC assay. Toxin was added to the assay at a concentration of 10 ppm.

TABLE 1

Comparative binding of ergotamine by two binders in vitro

| Binder | Binder + toxin | Toxin | % binding |
| --- | --- | --- | --- |
| Yeast cell wall extract/aluminosilicate clay | 100603 | 876640 | 88.52% |
| Particulate Yeast Glucan | 155170 | 849446 | 81.73% |

Both binders showed a definite ability to bind ergotamine at a rate normally added to feed (2 kg/ton). However, the present invention was substantially more efficient at binding of ergotamine than the yeast extract used for comparison.

Example 2

The following experiments show the ability of the present invention to bind alkaloids causative of diseases such as fescue toxicity in vitro in various solvents representative of conditions typical of the ruminant digestive system. Graph B shows the ability of the present invention to bind ergotamine in McDougal's solution, an artificial saliva, compared to binding in water.

Graph C shows the ability of the present invention to bind ergotamine in an environment representative of the ruminant digestive system. Binding in water, McDougal's solution, and clarified rumen fluid are shown.

Graph B and C clearly show the ability of the present invention to bind alkaloids causative of diseases such as fescue toxicity in varying environments typical of the ruminant digestive tract, i.e. artificial saliva and rumen fluid.

Example 3

The following experiment shows the ability of the present invention to bind alkaloids associated with fescue toxicity in vitro. Ability of the present invention to bind alkaloids was tested on crude extracts of fescue seeds which contained various endophyte-related ergot alkaloids. Data presented show binding of ergotamine, ergovaline, and ergovalinine.

TABLE 2

| Percent yeast cell Wall Extract/Aluminosilicate (w/v) | Plant Alkaloid | | |
|---|---|---|---|
| | Ergovaline | Ergovalinine | Ergotamine |
| 0.01 | 0 | 0 | 0 |
| 0.05 | 30 | 0 | 12 |
| 0.1 | 99 | 60 | 456 |
| 0.5 | 486 | 420 | 600 |
| 1 | 600 | 600 | 600 |
| 5 | 600 | 600 | 600 |

Alkaloids remaining in solution measured by HPLC assay.
Results expressed AS ng toxin bound.
0.2 ml fescue seed extract added to 9.8 ml of yeast cell wall extract/aluminosilicate.

The present invention effectively bound all alkaloids tested, especially at the binder concentrations of 0.1% and higher. The present invention was most effective at binding ergotamine under the experimental conditions tested.

These results show that the composition provided by the present invention, i.e. a modified yeast cell wall extract in combination with a suitable mineral clay, provides an effective method for binding and removal of ergot alkaloids associated with conditions such as fescue toxicity and ryegrass staggers. The present invention was effective at removal of various alkaloids under conditions representative of conditions expected in the ruminant digestive system.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitable entitled.

What is claimed is:

1. A method for improving the nutritional quality of a forage containing an ergot alkaloid and for improving the subsequent health and performance of an animal consuming the forage, comprising feeding to an animal an effective amount of a composition comprised of a yeast cell wall extract and a mineral clay thereby binding and inactivating the alkaloid in the animal feed.

2. The method of claim 1, wherein the effective amount of the composition comprises from between about 0.0125% to between about 4% by weight of the animal's daily feed ration.

3. The method of claim 1, wherein the animal is selected from the group consisting of bovine, equine, ovine, and caprine species.

4. The method of claim 1, wherein the ergot alkaloid is selected from the group consisting of Ergotamine, Ergovaline, Ergovalinine, and Ergonovine.

5. The method of claim 1, wherein the composition is admixed with any commercially available animal feed prior to feeding.

6. The method of claim 1, whereby the composition is fed to any animal as a supplement to commercially available feeds or forages.

7. The method of claim 1, wherein the yeast cell wall is extracted from a yeast selected from the group consisting of Saccharomyces, Candida, Kluyveromyces, Torulaspora or a combination thereof.

8. The method of claim 7, wherein the yeast cell wall extract is extracted from a *Saccharomyces cerevisiae* yeast.

9. The method of claim 8, wherein the mineral clay is an aluminosilicate clay.

10. The method of claim 1, wherein the yeast cell wall is modified prior to extraction.

11. The method of claim 10, wherein the yeast cell wall is modified by an alcohol shocking of the yeast thereby increasing the mycotoxin-binding capacity of the yeast cell wall.

12. The method of claim 11, wherein the yeast cell wall is modified by exposing the yeast to a growth environment comprising from between about 5% and about 20% alcohol.

13. The method of claim 7, wherein the yeast cell wall is modified by exposing the yeast to a growth environment comprising from between about 10% and about 12% alcohol.

14. The method of claim 1, wherein the mineral clay is selected from the group consisting of zeolite, a bentonite, an aluminosilicate or mixtures thereof.

* * * * *